US011976804B1

(12) United States Patent
Xu et al.

(10) Patent No.: US 11,976,804 B1
(45) Date of Patent: May 7, 2024

(54) LED LAMP

(71) Applicant: SHENZHEN SNC OPTO ELECTRONIC CO., LTD, Shenzhen (CN)

(72) Inventors: Jianyong Xu, Shenzhen (CN); Zhikeng Mo, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/243,094

(22) Filed: Sep. 6, 2023

(30) Foreign Application Priority Data

Jun. 25, 2023 (CN) ........................ 202310752194.X

(51) Int. Cl.

| | |
|---|---|
| ***F21V 19/04*** | (2006.01) |
| ***F21V 19/00*** | (2006.01) |
| ***F21V 23/04*** | (2006.01) |
| ***F21V 29/503*** | (2015.01) |
| ***F21V 29/76*** | (2015.01) |
| ***F21Y 105/16*** | (2016.01) |
| ***F21Y 115/10*** | (2016.01) |

(52) U.S. Cl.
CPC .......... *F21V 19/04* (2013.01); *F21V 19/0035* (2013.01); *F21V 23/045* (2013.01); *F21V 29/503* (2015.01); *F21V 29/763* (2015.01); *F21Y 2105/16* (2016.08); *F21Y 2115/10* (2016.08)

(58) Field of Classification Search
CPC .... F21V 19/04; F21V 19/0035; F21V 23/045; F21V 29/503; F21V 29/763; F21S 8/04; F21Y 2105/10; F21Y 2105/16; F21Y 2115/10
See application file for complete search history.

(56) References Cited

U.S. PATENT DOCUMENTS 9,593,837 B2 * 3/2017 Wilcox .................. H05B 45/24
2011/0103059 A1 * 5/2011 Chen ..................... F21V 31/005
362/249.02

FOREIGN PATENT DOCUMENTS

JP 2010027615 * 2/2010 .............. F21V 5/007

OTHER PUBLICATIONS

Japan 2010027615 Feb. 4, 2010. Kenji Miura, English Translation (Year: 2010).*

* cited by examiner

*Primary Examiner* — Peggy A Neils

(57) ABSTRACT

An LED lamp includes a heat sink including a first surface with a first receiving portion thereof, and at least one LED plate installed at a bottom portion of the first receiving portion; a second receiving portion arranged on a top portion of the first receiving portion to receive a transparent element therein that covers a light-emitting surface of the LED plate; an insertion port arranged on the second receiving portion and located on a first plane of a first end of the heat sink; a first moving member arranged on the first plane of the first end and corresponding to the insertion port, a second moving member arranged on a second plane of the first end and movably connected to the heat sink, both the first and second moving members movably connected to each other and moving relative to the heat sink to open or close the insertion port.

19 Claims, 10 Drawing Sheets

A

LED LAMP

CROSS-REFERENCE TO RELATED APPLICATION

This application claims priority to Chinese Patent Application No. 202310752194.X, entitled "LED LAMP" and filed on Jun. 25, 2023, the content of which is hereby incorporated by reference in its entirety.

BACKGROUND

Technical Field

The present disclosure generally relates to the field of lighting devices, and especially relates to an LED lamp which can be convenient to assembly or replace transparent elements thereof.

Description of Related Art

An LED lamp, with a plurality of advantages such as environmental protection and a long lifespan, has been widely used in various lighting places. A conventional LED lamp generally includes a transparent element usually fixed to a heat sink by screws; because there is a plurality of screws, a screwdriver is needed to fix the plurality of screws, thereby an assembly of the transparent element is very slow and inconvenient, of low installation efficiency and high labor costs. Furthermore, due to need different requirements for light distribution in different countries or places, different types of transparent elements need to be replaced according to different requirements, such as lens panels or flat glass panels, which is extremely inconvenient to use the screwdriver to disassemble the transparent elements.

In order to improve production efficiency or facilitate to independently replace the transparent elements, it is necessary to improve structures of the conventional LED lamp.

SUMMARY

The technical problems to be solved: in view of the shortcomings of the related art, the present disclosure provides an LED lamp which can be convenient for assembly or maintenance a transparent element of the LED lamp.

In order to implement the above technical purpose, a technical solution provided by the present disclosure is: an LED lamp according to an embodiment of the present disclosure includes an LED lamp according to an embodiment of the present disclosure includes a heat sink and at least one LED plate, the heat sink including a first surface with a first receiving portion being formed thereof; the at least one LED plate installed at a bottom portion of the first receiving portion, a second receiving portion arranged on a top portion of the first receiving portion to receive a detachable transparent element therein, the transparent element covering a light-emitting surface of the at least one LED plate, an insertion port arranged on the second receiving portion and located on a first plane of a first end of the heat sink; and wherein a first moving member is arranged on the first plane of the first end and corresponding to the insertion port, and a second moving member is arranged on a second plane of the first end and movably connected to the heat sink so that both the first moving member and the second moving member are movably connected to each other and move relative to the heat sink to open or close the insertion port.

Wherein the second moving member includes a first installation portion with a first opening facing a second surface of the heat sink, and an elastic reset member arranged inside the first installation portion.

Wherein the first moving member includes a rotating shaft and the second moving member includes a shaft hole; the first moving member is rotatably connected to the second moving member through the rotating shaft inserting into the shaft hole, so that the first moving member rotates around the rotating shaft.

Wherein the first moving member includes a first plate and a second plate arranged with an angle therebetween, the first plate arranged on the second surface of the heat sink, the second plate arranged on the first plane of the first end of the heat sink, the rotating shaft arranged on an edge of the first plate away from the second plate, the first plate movably connected to the second moving member, the second moving member configured to drive the first plate to move so as to adjust position states of the first moving member; and wherein when the first moving member is in a first state, the second moving member limits the first plate to move, and the second plate blocks the insertion port; and when the first moving member is in a second state, the second moving member drives the first plate to move, and the second plate opens the insertion port.

Wherein the heat sink includes a first supporting member and a second supporting member separated from the first supporting member, the first supporting member away from the second plate relative to the second supporting member; when the first moving member is in the first state, the first plate covers both the first and second supporting members, and when the first moving member is in the second state, the first plate does not cover the first and second supporting members.

Wherein a height of the first supporting member is greater than that of the second supporting member, and the first supporting member and the second supporting member are separated from each other so that a rotating groove is formed between the first supporting member and the second supporting member, and connected to the shaft hole.

Wherein when the first moving member is in the first state, the first plate is supported on the first supporting member, and the second plate blocks the insertion port.

Wherein when the first moving member is in the second state, the rotating shaft of the first plate is received in the rotating groove so that the second plate rotates to open the insertion port.

Wherein the first end of the heat sink includes an end wall extending towards the first plate, a first portion of the elastic reset member abutting against an inner wall of the first installation portion, and a second portion of the elastic reset member abutting against the end wall.

Wherein the second moving member includes a side wall, the shaft hole arranged on the side wall and a notch provided on the side wall, the side wall separated from the end wall.

Wherein the second moving member includes a second opening arranged at an end of the second moving member that is close to the second plate, and a depth of the second opening is greater than a height of the end wall.

Wherein the second moving member includes a long-strip hole passing therethrough, and a screw passing through the long-strip hole to connect to the heat sink; a nut of the screw is un-contact with the second moving member along an axial direction of the screw.

Wherein the heat sink includes a middle portion and two side portions arranged on both sides of the middle portion respectively, a gap formed between the middle portion and each of the two side portions, the at least one LED plate installed in each of the two side portions, a power supply arranged on the middle portion and electrically connected to the at least one LED plate.

Wherein a cover covers the peripheral of the power supply.

Wherein a wiring recess is formed between the middle portion and each of the two side portions and located at the second end of the heat sink, the wiring recess connected to both the first receiving portion and the cover, and the at least one LED plate electrically connected to the power supply through the wiring recess.

Wherein an interface is arranged on the middle portion of the heat sink, and a detachable sensor is connected to the interface and electrically connected to the at least one LED plate.

Wherein a cylindrical mounting member with a threaded mounting hole, or a pair of U-shaped mounting members is arranged on the second surface of the heat sink, or a lifting rope is connected to the second surface of the heat sink.

An LED lamp according to another embodiment of the present disclosure includes:

- a heat sink including a first receiving portion and a second receiving portion respectively arranged on a first surface of the heat sink, both the first and second receiving portions connected with each other, the second receiving portion arranged on a top portion of the first receiving portion, an insertion port arranged on the second receiving portion and located on a first plane of a first end of the heat sink;
- at least one LED plate installed in a bottom portion of the first receiving portion;
- at least one transparent element covering a light-emitting surface of the at least one LED plate;
- a first moving member arranged on the first end of the heat sink and directly connected to the heat sink in a movable manner, or the first moving member connected to the heat sink in a movable manner through other components, so that the first moving member moves relative to the heat sink; and wherein
- when the first moving member is in a first state, the first moving member blocks the insertion port; and
- when the first moving member is in a second state, the first moving member opens the insertion port.

Wherein the LED lamp further includes:

- a second moving member movably connected to the heat sink, and comprising a shaft hole and a first installation portion, a first opening arranged on the first installation portion and facing a second surface of the heat sink; and
- an elastic reset member arranged inside the first installation portion;
- the first moving member including:
- a first plate arranged on the second surface of the heat sink;
- a second plate arranged on the first plane of the first end, and an angle formed between the first plate and the second plate; and
- a rotating shaft located at an end of the first plate away from the second plate, and inserted into the shaft hole; the first plate and the second moving member rotatably connected with each other through the rotating shaft inserting into the shaft hole;
- the heat sink including a first supporting member and a second supporting member, both the first supporting member and the second supporting member spaced apart to form a rotating groove therebetween, the rotating groove connected to the shaft hole; the first supporting member away from the second plate relative to the second supporting member, and a height of the first supporting member greater than a height of the second supporting member; and wherein
- when the first moving member is in the first state, the first plate is supported on the first supporting member, and the second plate blocks the insertion port.

An LED lamp according to another embodiment of the present disclosure includes a heat sink and at least one LED plate, the heat sink including a first surface with a first receiving portion being formed thereof; and the at least one LED plate installed at a bottom portion of the first receiving portion, a second receiving portion arranged on a top portion of the first receiving portion to receive a detachable transparent element therein, the transparent element covering a light-emitting surface of the at least one LED plate, an insertion port arranged on the second receiving portion and located on a first plane of a first end of the heat sink; and wherein a first moving member is arranged on the first plane of the first end and corresponding to the insertion port, and when the first moving member is in a first state, the first moving member blocks the insertion port.

Wherein the heat sink includes a middle portion and two side portions arranged on both sides of the middle portion respectively, a gap formed between the middle portion and each of the two side portions, the at least one LED plate installed in each of the two side portions, a power supply arranged on the middle portion and electrically connected to the at least one LED plate; and wherein

- a cover covers the peripheral of the power supply; and
- a wiring recess is formed between the middle portion and each of the two side portions, and located at the second end of the heat sink, the wiring recess connected to both the first receiving portion and the cover, and the at least one LED plate electrically connected to the power supply through the wiring recess.

Wherein an interface is arranged on the middle portion of the heat sink, and a detachable sensor is connected to the interface and electrically connected to the at least one LED plate.

Wherein a cylindrical mounting member with a threaded mounting hole, or a pair of U-shaped mounting members is arranged on the second surface of the heat sink, or a lifting rope is connected to the second surface of the heat sink.

The present disclosure provides the advantages as below: the present disclosure can manually assemble or replace the transparent element of the LED lamp, and be easy to operate the LED lamp.

It should be pointed out that any product of the present disclosure does not need obtaining all the above effects simultaneously.

BRIEF DESCRIPTION OF THE DRAWINGS

Reference will now be made in detail to embodiments, examples of which are illustrated in the accompanying drawings.

1 heat sink, 2 LED plate, 3 first receiving portion, 4 second receiving portion, 5 transparent element, 6 insertion port, 7 first moving member, 8 second moving member, 9 first installation portion, 10 first opening, 11 spring, 12 rotating shaft, 13 shaft hole, 14 first plate, 15 second plate, 16 first supporting member, 17 second supporting member, 18 rotating groove, 19 end wall, 20 second opening, 21 sidewall, 22 notch, 23 long-strip hole, 24 screw, 25 middle portion, 26 side portion, 27 gap, 28 power supply, 29 cover, 30 wiring recess, 31 column mounting member, 32 installing hole, 33 U-shaped mounting member, 34 lifting rope, 35 interface, 36 sensor, 37 bottom portion, 38 top portion, 39 light-emitting surface, 40 first end, 41 second end, 42 first portion, 43 second portion, 44 nut, 300 first surface, 301 second surface, 400 first plane, 401 second plane, 500 an end, 600 inner wall.

DETAILED DESCRIPTION

Figure 1:
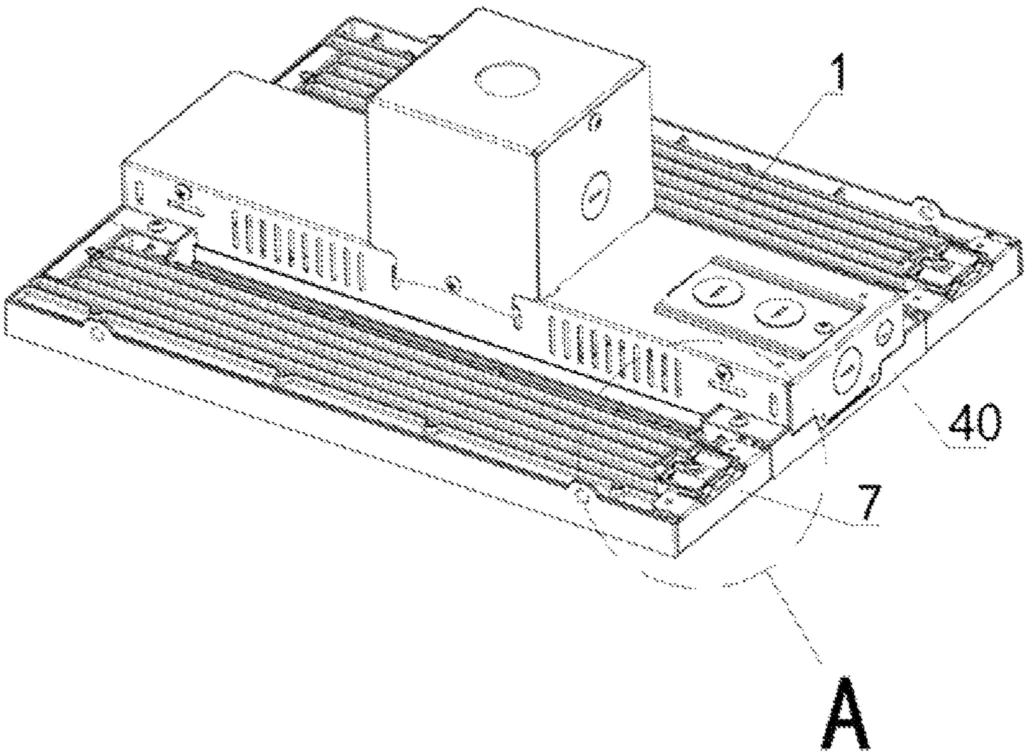
FIG. 1 is a schematic view of an LED lamp in accordance with an embodiment of the present disclosure.
Figure 2:
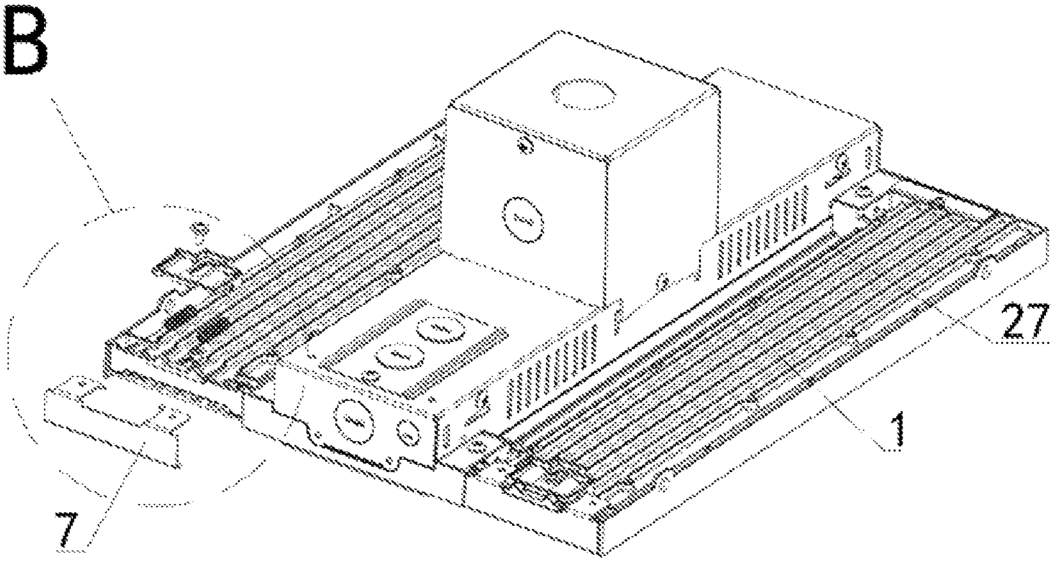
FIG. 2 is an exploded, schematic view of the LED lamp of FIG. 1.
Figure 3:
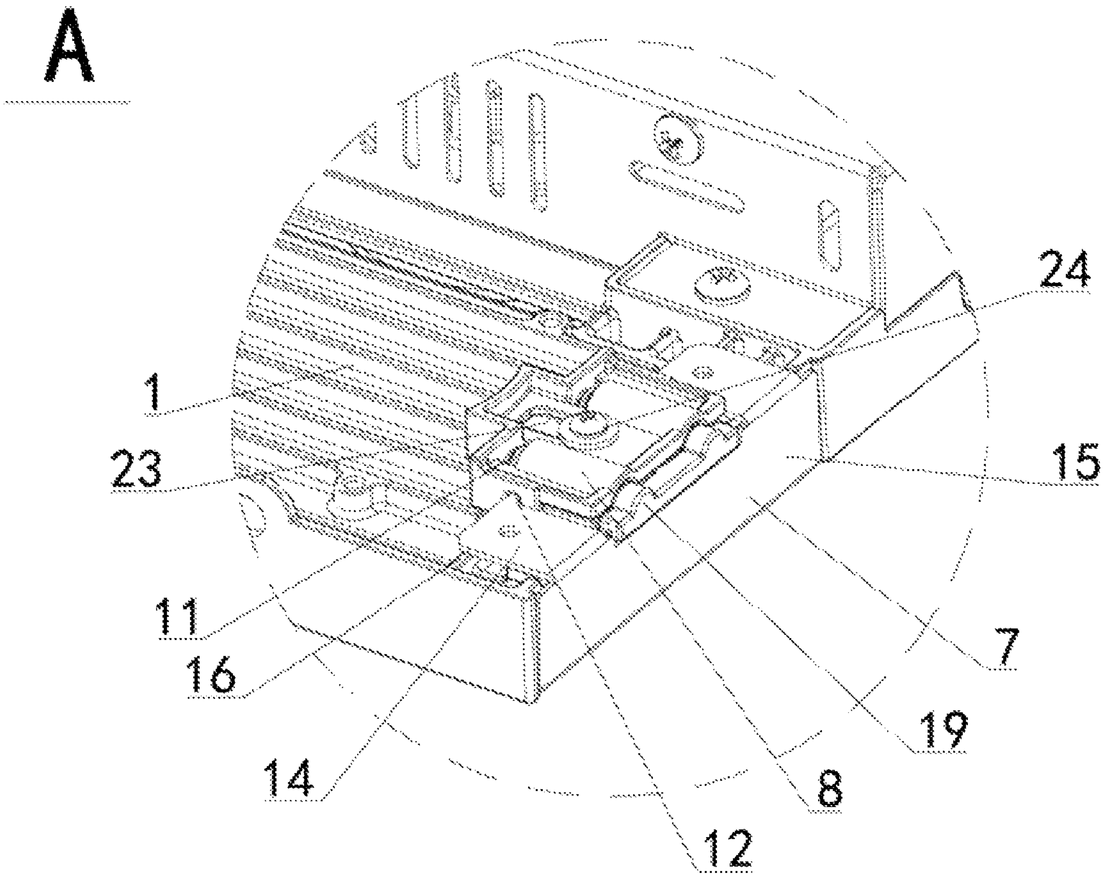
FIG. 3 is an enlarged view of a circle A of the LED lamp of FIG. 1.
Figure 4:
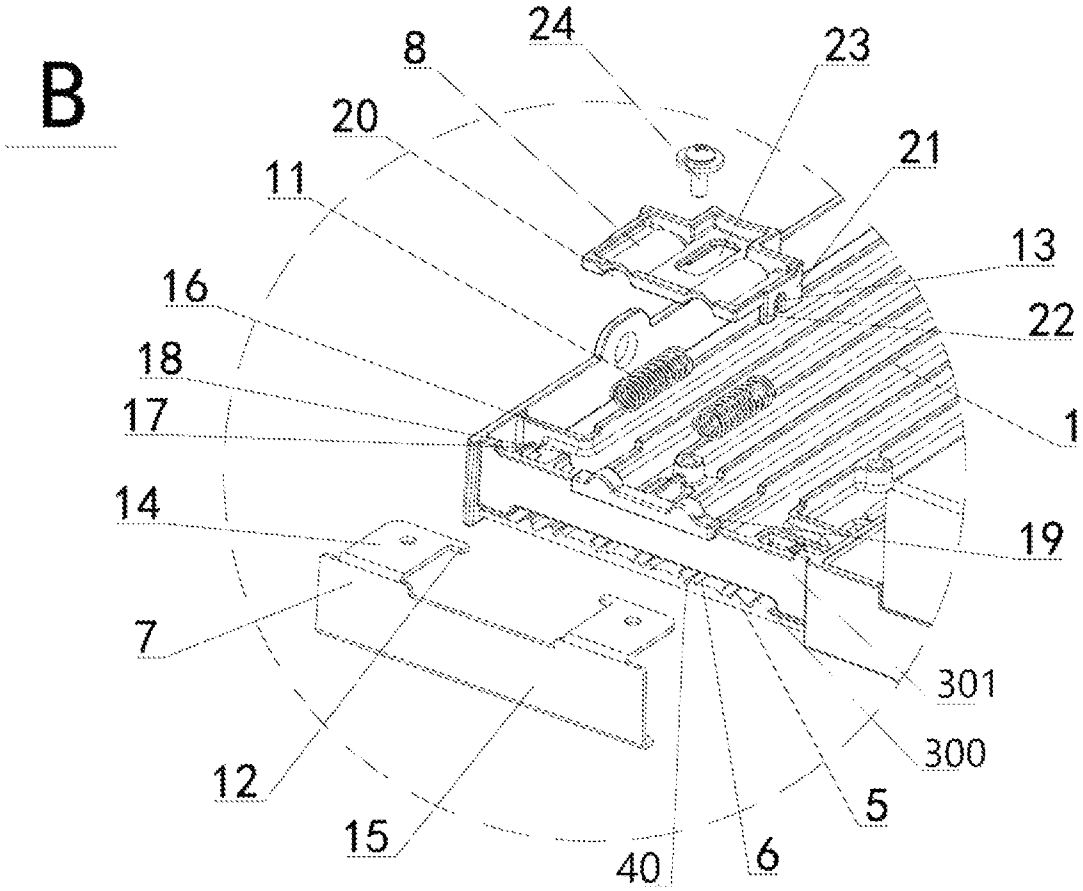
FIG. 4 is an enlarged view of a circle B of the LED lamp of FIG. 2.

Referring to FIG. 1 to FIG. 15, an LED lamp in accordance with an embodiment of the present disclosure includes a heat sink 1 and at least one LED plate 2. The heat sink 1 includes a first surface 300 with a first receiving portion 3 being formed thereof. In an embodiment of the present disclosure, the first surface 300 of the heat sink 1 refers that a surface of the heat sink 1 faces a transparent element 5. The at least one LED plate 2 is installed at a bottom portion 37 of the first receiving portion 3, a second receiving portion 4 is arranged on a top portion 38 of the first receiving portion 3 to receive the detachable transparent element 5 therein, the transparent element 5 covering a light-emitting surface 39 of the at least one LED plate 2. An insertion port 6 is arranged on the second receiving portion 4 and located on a first plane 400 of a first end 40 of the heat sink 1. In an embodiment of the present disclosure, the first plane 400 of the first end 40 refers to a vertical end face formed by a width and a height of the first end 40. A first moving member 7 (shown in FIG. 1) is arranged on the first plane 400 of the first end 40 and corresponding to the insertion port 6, and a second moving member 8 is arranged on a second plane 401 of the first end 40 and movably connected to the heat sink 1. The first plane 400 is arranged adjacent to the second plane 401, and both the first moving member 7 and the second moving member 8 are movably connected to each other and move relative to the heat sink 1 to open or close the insertion port 6.

Figure 7:
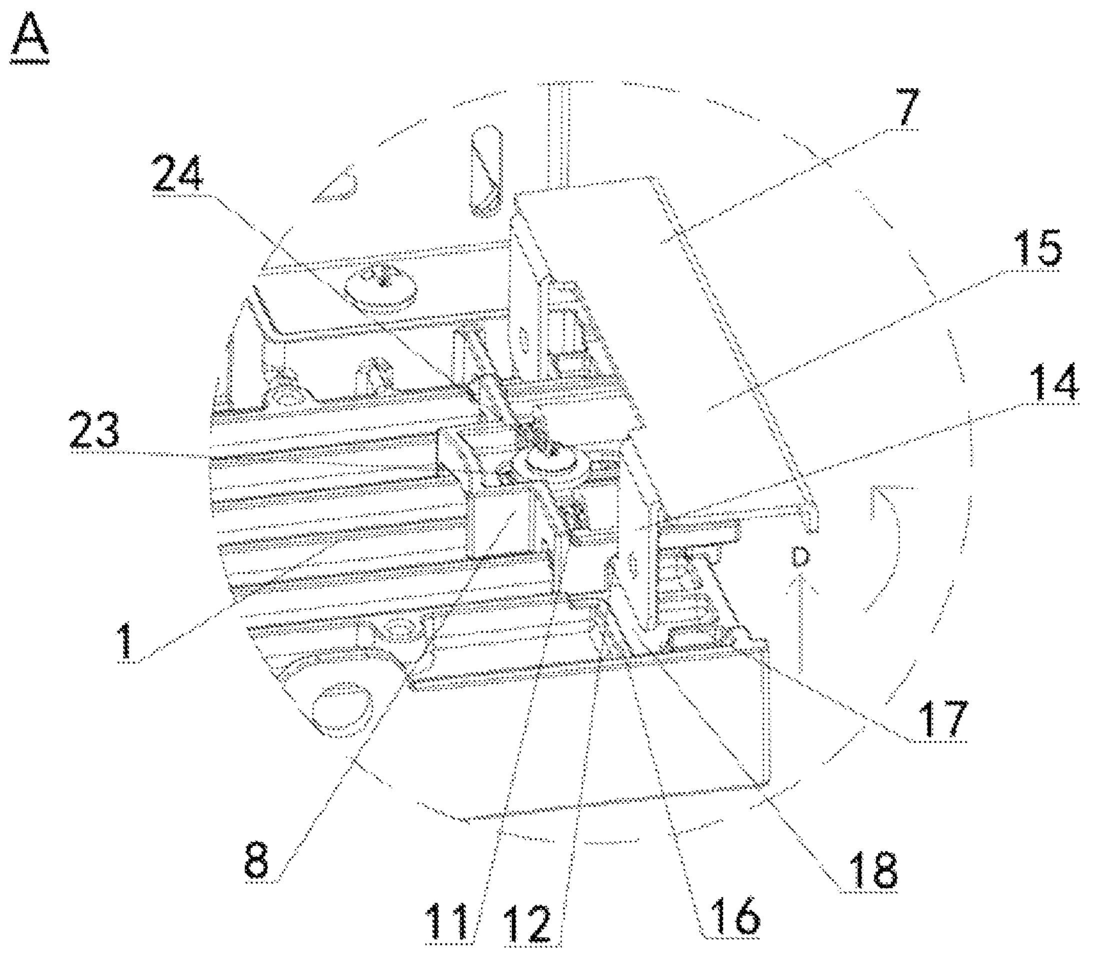
FIG. 7 is an assembly schematic view of the circle A of the heat sink, the LED plate, the transparent element, the spring, the first moving member and the second moving member of the LED lamp of FIG. 1, but shown the first moving member turned over relative to the heat sink.
Figure 8:
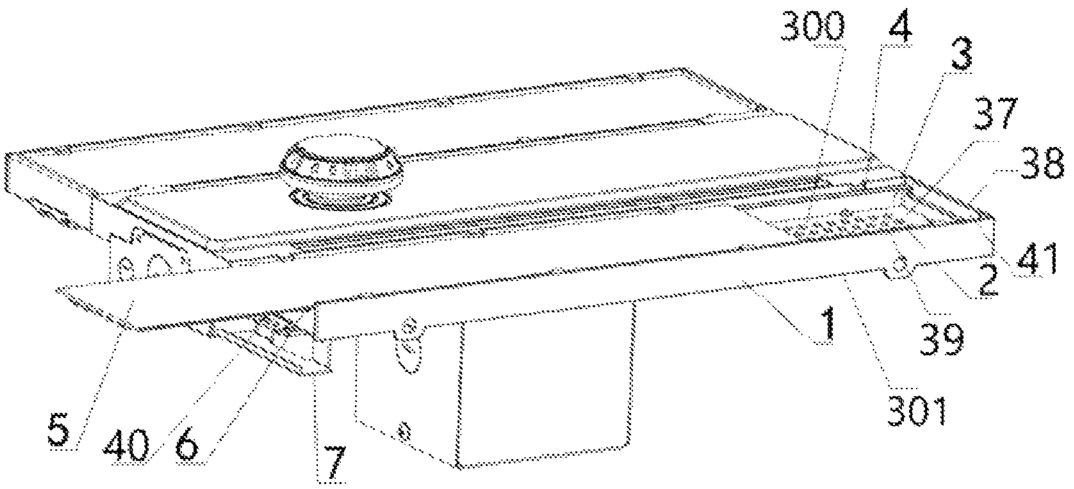
FIG. 8 is another exploded, schematic view of the LED lamp of FIG. 1.
Figure 9:
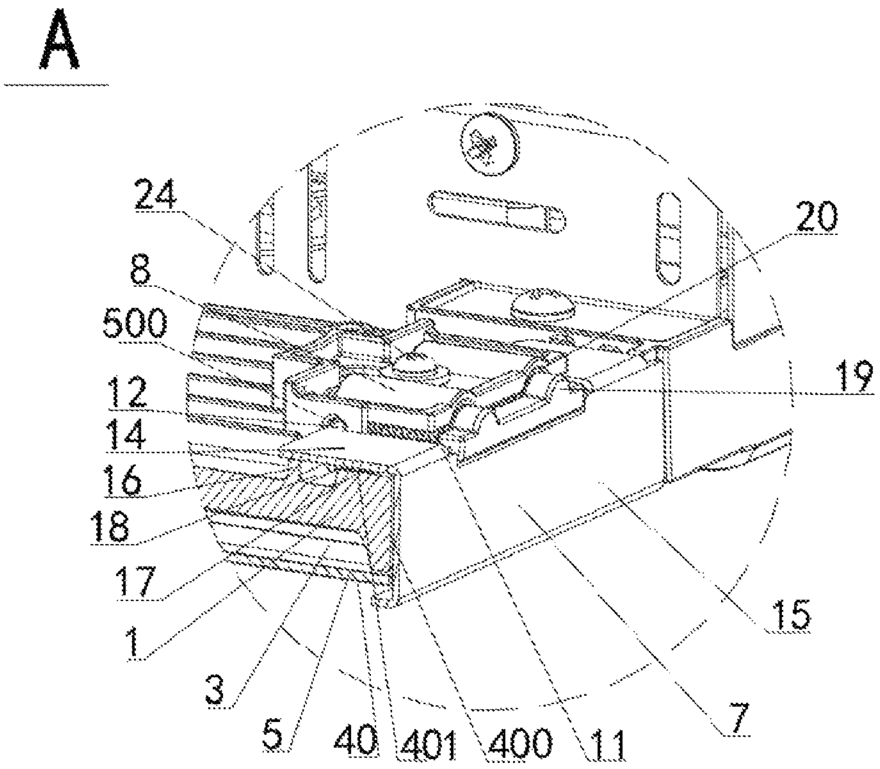
FIG. 9 is a partial assembly cross-sectional view of the circle A of the heat sink, the LED plate, the transparent element, the spring, the first moving member and the second moving member of the LED lamp of FIG. 1.

In an embodiment of the present disclosure, referring to FIG. 9, when the first moving member 7 is in a first state, the first moving member 7 blocks or closes the insertion port 6. Referring to FIG. 7, when the first moving member 7 is in a second state, the first moving member 7 opens the insertion port 6.

In an embodiment of the present disclosure, the first state of the first moving member 7 refers that the first moving member 7 blocks or closes the insertion port 6 so that the transparent element 5 can't be removed from the insertion port 6 or inserted into the insertion port 6. The second state of the first moving member 7 refers that the insertion port 6 is opened by the first moving member 7 so that the transparent element 5 can be removed from the insertion port 6 or be inserted into the insertion port 6.

Because the insertion port 6 is blocked by the first moving member 7, accidental detachment of the transparent element 5 from the insertion port 6 can be prevented, and damage to the transparent element 5 caused by sharp devices that are incorrectly operated can also be prevented.

It can be understood that the at least one LED plate 2 of the present disclosure includes a circuit board and a plurality of LED beads arranged on the circuit board.

It can be understood that the LED lamp of the present disclosure can be a panel mining lamp.

Figure 10:
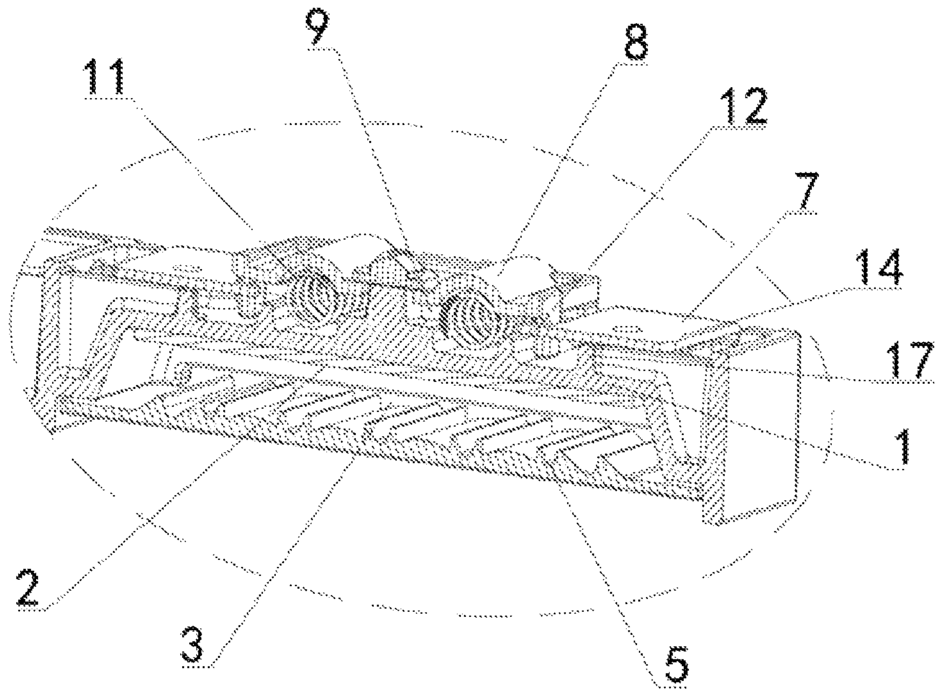
FIG. 10 is similar to FIG. 9, but shown from another view.

It can be understood that, referring to FIG. 10, the transparent element 5 of the present disclosure can be a lens plate. Optionally, the lens plate is equipped with a lens structure. The lens plate is an optical element configured to control propagation and focusing of light. The lens plate is located on the light-emitting surface 39 of an LED light source and configured to change a direction, a distribution, and an intensity of light. The lens plate can focus light through designing a shape and a curvature of the lens plate; when the light emitted by the LED beads spreads out, the lens plate can focus the light into a smaller area to improve brightness and intensity of the light. The lens plate can also change the distribution of light through designing surface textures or concave and convex structures of the lens plate. For example, the lens plate can scatter the light at a wider angle so that the light can be more evenly distributed within an illuminated area to reduce unevenness of the light. The lens plate can also change a propagation angle of the light, which can gather the light from a center of the LED light source and propagate the light along a specific direction, thereby changing a projection angle and a projection range of the light. In addition, the lens plate can provide additional protection against direct damage to the LED light source caused by dust, moisture, and other environmental factors. The lens plate serves as a physical barrier to reduce vulnerability and extend the lifespan of the LED lamp. Optionally, a material of the lens plate can be a silica gel, a PMMA (polymethyl methacrylate) or a PC (polycarbonate).

In an embodiment of the present disclosure, the LED light source is the LED plate 2.

In some embodiments of the present disclosure, the lens plate includes a lens substrate and a breathing valve fixed on the lens substrate. Optionally, the lens substrate includes a groove protruding towards outwardly and configured to receive the breathing valve therein, and a breathing hole is arranged on the groove. By directly fixing the breathing valve on the lens plate, it can ensure that a hot air inside a housing is timely exported through the breathing valve during operation of a lighting fixture, thereby ensuring that a pressure inside the housing is consistent with an external pressure, avoiding a problem that the lens plate is damaged due to pressure changes, and improving a service life of the lighting fixture; and the breathing valve is provided that water vapor inside the housing can be timely exported to avoid condensation on the lens plate to affect the light output of the lighting fixture.

The second moving member 8 includes a first installation portion 9 with a first opening 10 facing a second surface 301 of the heat sink 1, and an elastic reset member is arranged inside the first installation portion 9 and placed on the first opening 10.

In an embodiment of the present disclosure, the first surface 300 is opposite to the second surface 301.

It can be understood that the elastic reset member is elastic, or can generate an elastic force, such as the elastic reset member including a spring 11.

Referring to FIG. 4 to FIG. 7, the first moving member 7 includes a rotating shaft 12, and the second moving member 8 includes a shaft hole 13; the first moving member 7 is rotatably connected to the second moving member 8 through the rotating shaft 12 inserting into the shaft hole 13, so that the first moving member 7 rotates around the rotating shaft 12. The second moving member 8 moves to drive the first moving member 7 to move, so that the first moving member 7 can turn over when the first moving member 7 moves to a certain distance. For example, the first moving member 7 turning over an angle of 90 degrees, in this way, an obstruction or closure of the insertion port 6 caused by the first moving member 7 can be removed, thereby allowing the transparent element 5 to be inserted into or removed from the insertion port 6.

The transparent element 5 of the present disclosure can be inserted into or removed from the insertion port 6 by turning over the first moving member 7, which can greatly improve convenience of installation and disassembly without needing additional tools.

It is understood that the first moving member 7 can be a sheet metal component, and the rotating shaft 12 can be a tabular structure.

The first moving member 7 includes a first plate 14 and a second plate 15 arranged with an angle therebetween, the first plate 14 arranged on the second surface 301 of the heat sink 1, the first surface 300 opposite to the second surface 301, the second plate 15 arranged on the first plane 400 of the first end 40 of the heat sink 1. In an embodiment of the present disclosure, the heat sink 1 has two ends, namely the first end 40 and the second end 41. The first end 40 is any end of the heat sink 1, and the second end 41 is the other end opposite to the first end 40. The rotating shaft 12 is arranged on an edge 500 of the first plate 14 away from the second plate 15, the first plate 14 movably connected to the second moving member 8, the second moving member 8 configured to drive the first plate 14 to move so as to adjust position states of the first moving member 7. When the first moving member 7 is in the first state, the second moving member 8 limits the first plate 14 to move and the second plate 15 blocks the insertion port 6; and when the first moving member 7 is in the second state, referring to FIG. 7, the second moving member 8 drives the first plate 14 to move, and the second plate 15 opens the insertion port 6. In an embodiment of the present disclosure, when the first moving member 7 is in the first state, the second plate 15 blocks the insertion port 6, and the transparent element 5 can't be inserted into or removed from the insertion port 6; and when the first moving member 7 is in the second state, the second plate 15 opens the insertion port 6, and the transparent element 5 can be inserted into or removed from the insertion port 6.

In an embodiment of the present disclosure, when the first moving member 7 is in the first state, the second plate 15 blocks the insertion port 6, and the transparent element 5 can't be inserted into or removed from the insertion port 6; and when the first moving member 7 is in the second state, the second plate 15 opens the insertion port 6, and the transparent element 5 can be inserted into or removed from the insertion port 6.

It can be understood that the angle between the first plate 14 and the second plate 15 can be 90 degrees.

Figure 15:
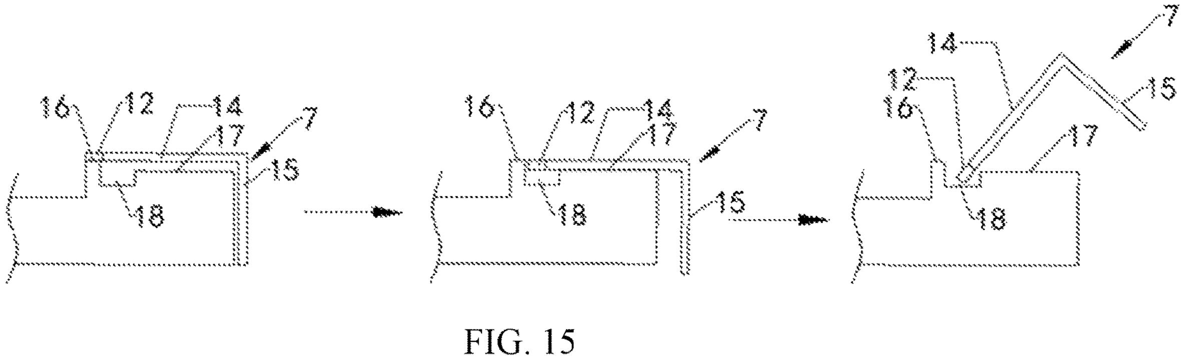
FIG. 15 is a schematic view of a first moving member of the LED lamp from a first state to a second state The element labels according to the embodiment of the present disclosure shown as below.

Referring to FIG. 7, FIG. 9 and FIG. 15, the heat sink 1 includes a first supporting member 16 and a second supporting member 17 separated from the first supporting member 16, the first supporting member 16 away from the second plate 15 relative to the second supporting member 17. When the first moving member 7 is in the first state, the first plate 14 covers both the first and second supporting members 16, 17, and when the first moving member 7 is in the second state, the first plate 14 does not cover the first and second supporting members 16, 17.

A height of the first supporting member 16 is greater than that of the second supporting member 17, and the first supporting member 16 and the second supporting member 17 are separated from each other so that a rotating groove 18 is formed between the first supporting member 16 and the second supporting member 17, and connected to the shaft hole 13. That is to say, the rotating groove 18 is arranged between the first supporting member 16 and the second supporting member 17.

When the first moving member 7 is in the first state, the first plate 14 is supported on the first supporting member 16, and the second plate 15 blocks the insertion port 6; and when the first moving member 7 is in the second state, the rotating shaft 13 of the first plate 14 is received in the rotating groove 18 and rotates relative to the rotating groove 18 so that the second plate 15 turns over to open the insertion port 6.

Due to the height of the first supporting member 16 is greater than that of the second supporting member 17 (referring to FIG. 15), when the first moving member 7 is in the first state, the first plate 14 is supported by the first supporting member 16, and the second plate 15 blocks the insertion port 6. When the second moving member 8 compresses the spring 11, the second moving member 8 simultaneously drives the first moving member 7 to move; and when the end of the first plate 14 away from the second plate 15 crosses the first supporting member 16, the first plate 14 will fall onto the second supporting member 17 under an action of gravity of the first plate 14. At this time, the first moving member 7 will be blocked by the first supporting member 16 so that the first moving member 7 can't move to back, while, the rotating shaft 12 is received in the rotating groove 18. And then, a second action can be applied on the first moving member 7, that is, the first moving member 7 is to be turned over a certain angle such as an angle of 90 degrees, so that the second plate 15 opens the insertion port 6 to cancel a blocking effect on the insertion port 6. In this way, the transparent element 5 can be inserted from the insertion port 6 into the second receiving portion 4 or removed from the second receiving portion 4 to be replaced.

When the LED lamp of the present disclosure is used, if the transparent element 5 needs to be inserted into or removed from the insertion port 6, an external force applies on the second moving member 8 so that the second moving member 8 moves along a first direction to compress the spring 11, and also drives the first moving member 7 to move, in this way, the first plate 14 will fall onto the second supporting member 17 under the action of gravity of the first plate 14. The rotating shaft 12 is received in the rotating groove 18 and rotates in the rotating groove 18, at the same time, the first moving member 7 is turned over the angle of 90 degrees along a second direction, and the second plate 15 opens the insertion port 6, so that the transparent element 5 can be inserted into or removed from the insertion port 6. After the transparent element 5 is inserted into or removed from the insertion port 6, the external force applies on the second plate 15 to cause the first moving member 7 to turn over along a third direction and lift up along the second direction, at this time, the rotating shaft 12 is detached from the rotating groove 18, and at the same time, the first moving member 7 is pushed along a fourth direction to return the first plate 14 to the first supporting member 16. The second plate 15 tightly covers the insertion port 6 under an action of the spring 11 and prevents the insertion port 6 from being accidentally opened, and the second moving member 8 moves along the fourth direction under the action of the spring 11.

During the first moving member 7 moving from the second state to the first state, the spring 11 moves from a compression state to an original state. During the first moving member 7 moving from the first state to the second state, the spring 11 moves from the original state to the compression state.

In an embodiment of the present disclosure, the second direction is opposite to the third direction. The first direction is the same as the compression direction of the spring 11, and opposite to the fourth direction. Referring to FIG. 7, the second direction is indicated by an arrow D.

That is to say, when the first moving member 7 is in the first state, the first plate 14 is supported by the first supporting member 16, the rotating shaft 12 is detached from the rotating groove 18, the second plate 15 blocks the insertion port 6, and the spring 11 is in the original state. When the first moving member 7 is in the second state, the spring 11 is compressed, the first moving member 7 is blocked by the first supporting member 16, the rotating shaft 12 is received in the rotating groove 18, and the second plate 15 opens the insertion port 6.

Because the height of the first supporting member 16 is greater than that of the second supporting member 17, when the first moving member 7 moves from the first state to the second state, the first moving member 7 will be blocked by the first supporting member 16, thereby preventing the first moving member 7 from being accidentally turned over, and preventing the insertion port 6 from being accidentally closed.

In an embodiment of the present disclosure, the height of the first supporting member 16 is greater than the height of the second supporting member 17, which is described with reference to the second direction.

Figure 5:
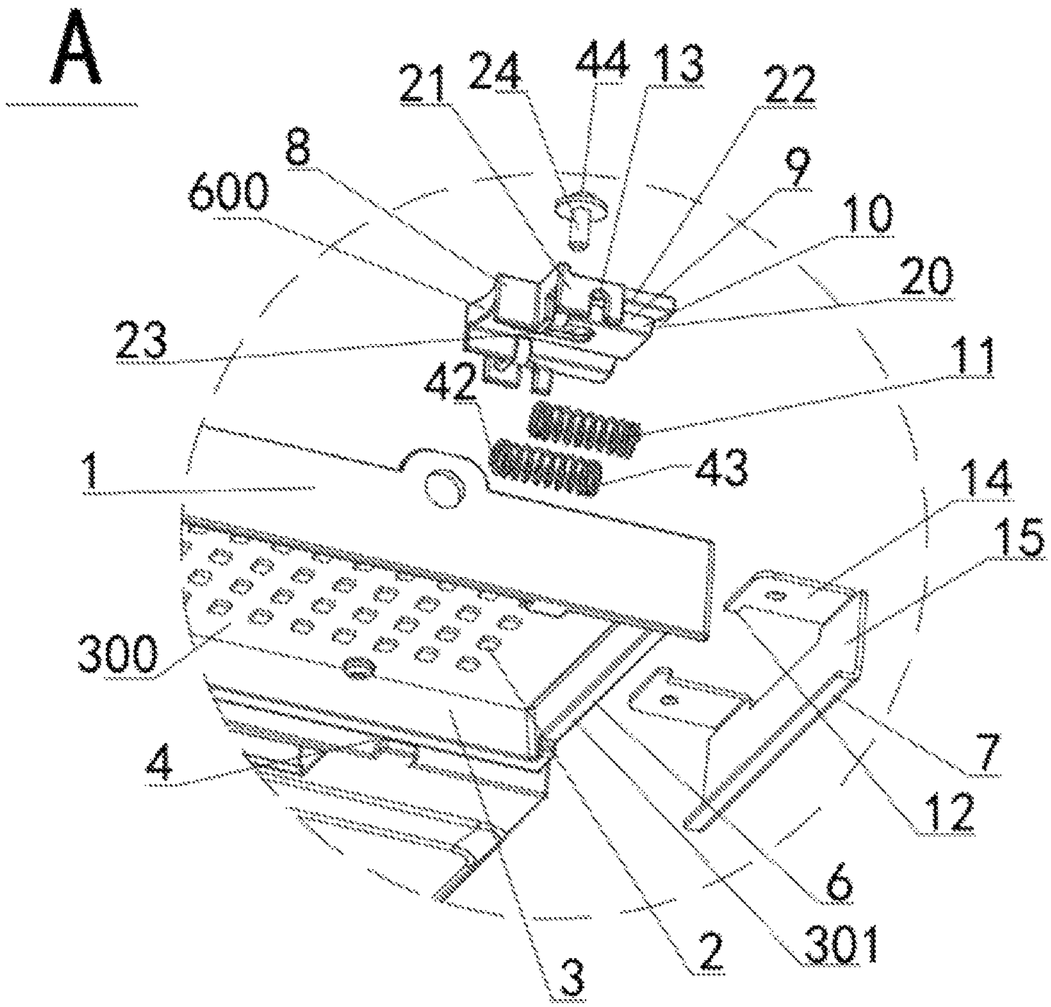
FIG. 5 is an exploded, schematic view of the circle A of a heat sink, an LED plate, a transparent element, a spring, a first moving member and a second moving member of the LED lamp of FIG. 1.
Figure 6:
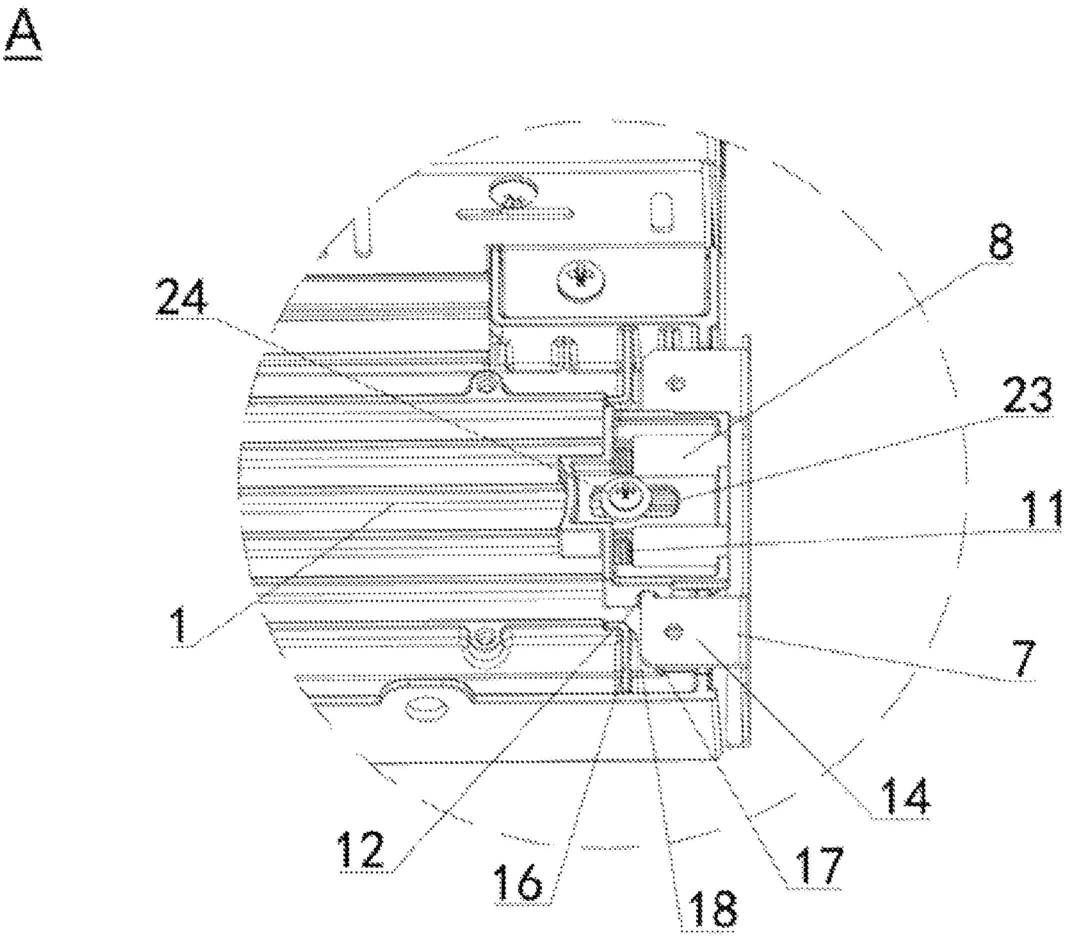
FIG. 6 is an assembly schematic view of the circle A of the heat sink, the LED plate, the transparent element, the spring, the first moving member and the second moving member of the LED lamp of FIG. 1.

Referring to FIG. 5 to FIG. 10, the first end 40 of the heat sink 1 includes an end wall 19 extending towards the first plate 14, a first portion 42 of the elastic reset member abutting against an inner wall 600 of the first installation portion 9, and a second portion 43 of the elastic reset member abutting against the end wall 19. Referring to FIG. 5, in an embodiment of the present disclosure, the elastic reset member includes two ends, namely the first portion 42 and the second portion 43. The first portion 42 is either end of the elastic reset member, and the second portion 43 is the other end opposite to the first portion 42.

The second moving member 8 includes a side wall 21, the shaft hole 13 arranged on the side wall 21 and a notch 22 provided on the side wall 21. The side wall 21 is separated from the end wall 19 so that the second moving member 8 can move smoothly without being blocked by the end wall 19.

The second moving member 8 includes a second opening 20 arranged at an end of the second moving member 8 that is close to the second plate 15, which is described with reference to the second direction. A depth of the second opening 20 is greater than a height of the end wall 19 (shown in FIG. 7 and FIG. 9), so as to prevent the second moving member 8 from being blocked during moving the second moving member 8.

The second moving member 8 includes a long-strip hole 23 passing therethrough, and a screw 24 (shown in FIG. 3) passing through the long-strip hole 23 to connect to the heat sink 1. A nut 44 of the screw 24 is un-contact with the second moving member 8 along an axial direction of the screw 24. In an embodiment of the present disclosure, the axial direction of the screw 24 is a length direction of the screw 24. The screw 24 provides the second moving member 8 can be movably connected to the heat sink 1, and moves within a certain range.

Optionally, a diameter of the nut 44 of the screw 24 is greater than that of the long-strip hole 23, thereby further limiting and fixing the second moving member 8 to avoid detachment of the second moving member 8.

Referring to FIGS. 1-2 and FIGS. 11-13, the heat sink 1 includes a middle portion 25 and two side portions 26 arranged on both sides of the middle portion 25 respectively, a gap 27 formed between the middle portion 25 and each of the two side portions 26, the at least one LED plate 2 installed in each of the two side portions 26, a power supply 28 arranged on the middle portion 25 and electrically connected to the at least one LED plate 2. The gap 27 is provided for isolating heat of the at least one LED plate 2 and the power supply 28, thereby improving respective service life of the at least one LED plate 2 and the power supply 28.

A cover 29 covers the peripheral of the power supply 28.

A wiring recess 30 is formed between the middle portion 25 and each of the two side portions 26, and located at the second end 41 of the heat sink 1; the wiring recess 30 connected to both the first receiving portion 3 and the cover 29, and the at least one LED plate 2 electrically connected to the power supply 28 through the wiring recess 30.

Figure 11:
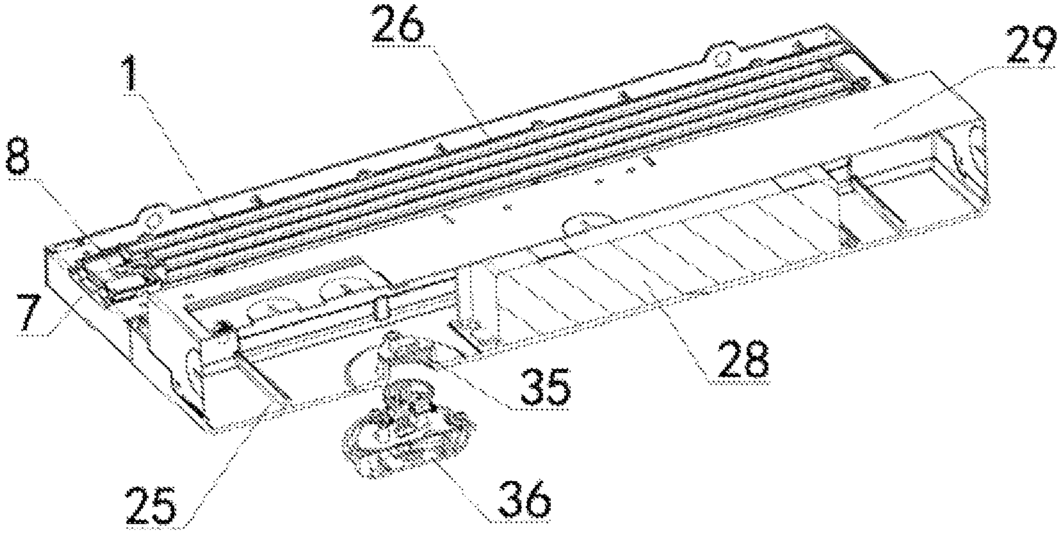
FIG. 11 is another exploded, schematic view of the LED lamp of FIG. 1.
Figure 12:
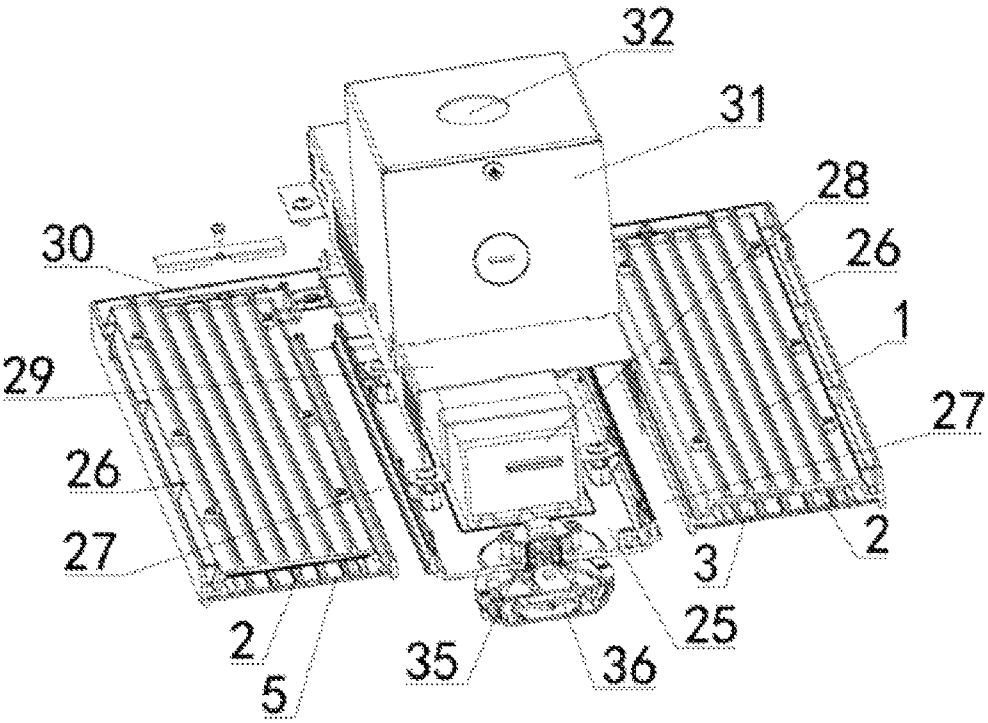
FIG. 12 is similar to FIG. 11, but shown from another view.
Figure 13:
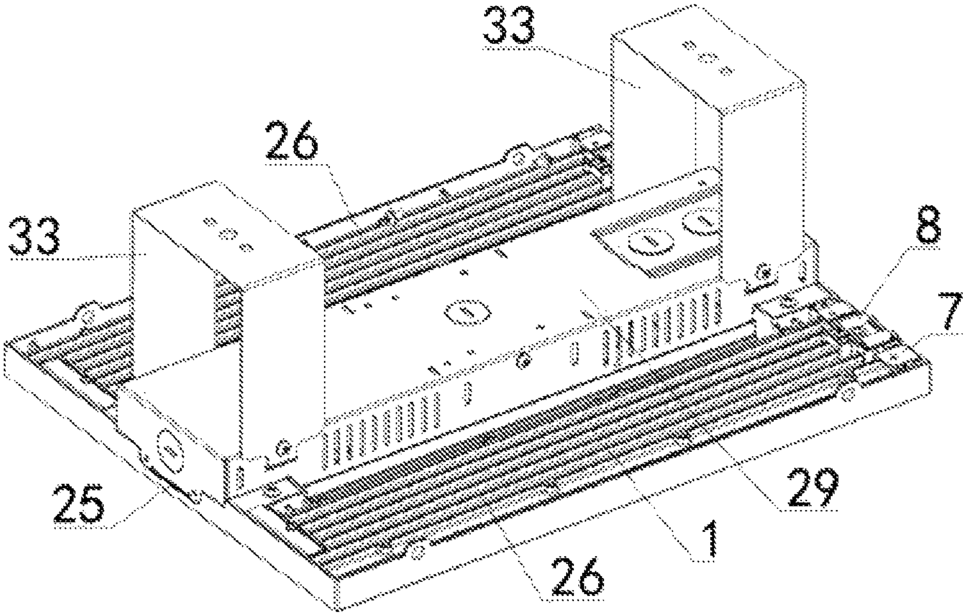
FIG. 13 is similar to FIG. 11, but shown from another view.
Figure 14:
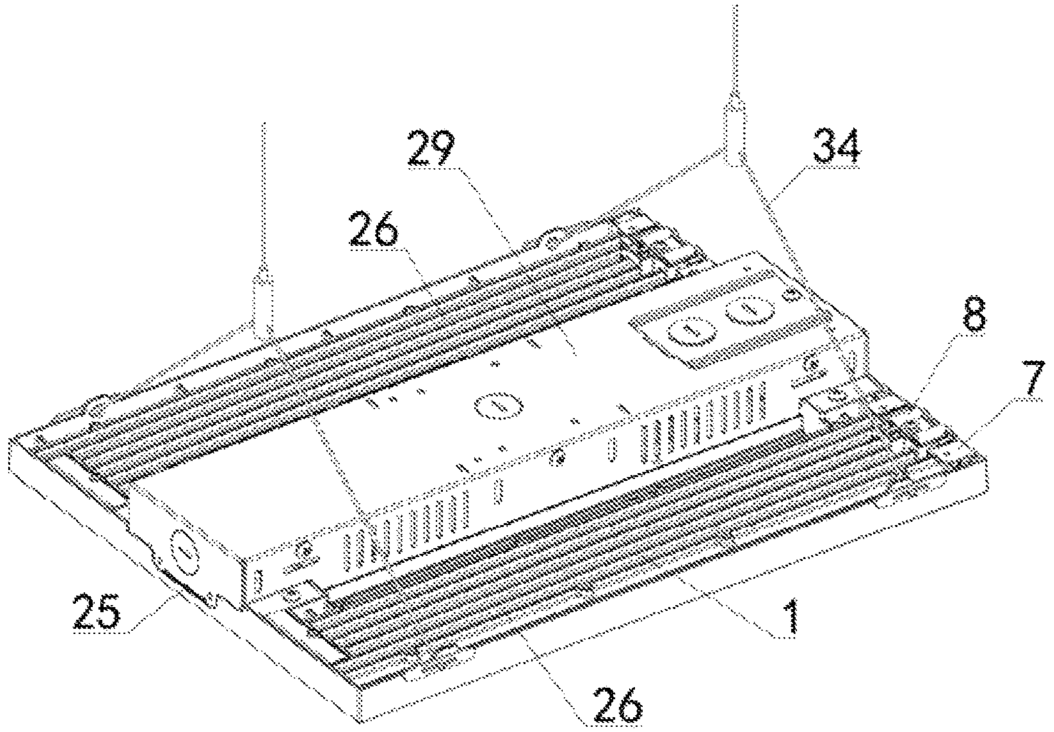
FIG. 14 is another exploded, schematic view of the LED lamp of FIG. 1.

Referring to FIG. 11, an interface 35 is arranged on the middle portion 25 of the heat sink, 1 and a detachable sensor 36 is connected to the interface 35 and electrically connected to the at least one LED plate 2. The sensor 36 is configured to adjust and control luminous modes of the at least one LED plate 2. Optionally, the sensor 36 can be a microwave radar sensor or an infrared sensor, which can be installed by users according to their own needs, so as to implement intelligent light control of the at least one LED plate 2. It should be noted that the sensor 36 is provided to adjust the luminous mode of the at least one LED plate 2, thereby improving diversity and intelligence of the LED lamp, and implementing intelligent light control of the LED lamp.

Furthermore, the LED lamp of the present disclosure also includes a receiver electrically connected to the sensor 36, and configured to receive instruction signals sent from the user. The receiver can be a voice controlled receiver or an electrical signal receiver. When the receiver is an electrical signal receiver, the user can send the instruction signals to the sensor 36 through a Bluetooth, a wireless network, or an infrared connection mode, thereby the lighting mode of the LED lamp can be adjusted by the sensor 36.

A cylindrical mounting member 31 with a threaded mounting hole (shown in FIG. 12), or a pair of U-shaped mounting members 33 (shown in FIG. 13) is arranged on the second surface 301 of the heat sink 1, or a lifting rope 24 (shown in FIG. 14) is connected to the second surface 301 of the heat sink 1.

In some embodiments of the present disclosure, the heat sink 1 includes the first surface 300 and the second surface 301 opposite to the first surface 300. An installation position for installing a heat source is arranged on the first surface 300, and a heat dissipation structure is arranged on the second surface 301 and configured to dissipate and cool heat generated by the heat source. A convection hole is arranged on a body of the heat sink 1 and passes through both the first surface 300 and the second surface 301. The convection hole is configured for air circulation between the installation position and the heat dissipation structure.

In the present disclosure, two opposite sides of the heat sink 1 are respectively equipped with the installation position and the heat dissipation structure, and the convection hole is also arranged on the body of the heat sink 1 and passes through the two opposite sides of the body, so as to facilitate air circulation between the installation position and the heat dissipation structure. Such setting greatly increases an air flow rate between the installation position and the heat dissipation structure through the convection hole, thereby improving heat transfer efficiency thereof, keeping a temperature of the installation position within a reasonable range without increasing an overall volume of the heat sink 1, and improving the service life of the LED lamp. Moreover, the convection hole is provided to reduce an overall material of the heat sink 1, thereby reducing a manufacturing cost and a weight of the LED lamp.

Both the first moving member 7 and the second moving member 8 are provided to detachably replace the transparent element 5. During the detachable replacement process, only the second moving member 8 needs to be manually adjusted to control a state of the first moving member 7, so that the insertion port 6 can be blocked or opened to conveniently replace the transparent element 5, which has characteristics of a simple structure and a convenient operation.

Referring to FIG. 1 to FIG. 15, an LED lamp in accordance with a specific embodiment of the present disclosure includes:

a heat sink 1 including a first receiving portion 3 and a second receiving portion 4 respectively arranged on a first surface 300 of the heat sink 1, and connected with each other, the second receiving portion 4 arranged on a top portion 38 of the first receiving portion 3, an insertion port 6 arranged on the second receiving portion 4 and located on a first plane 400 of a first end 40 of the heat sink 1;

at least one LED plate 2 installed in a bottom portion 37 of the first receiving portion 3;

at least one transparent element 5 covering a light-emitting surface 39 of the at least one LED plate 2;

a first moving member 7 arranged on the first end 40 of the heat sink 1 and directly connected to the heat sink 1 in a movable manner, or the first moving member 7 connected to the heat sink 1 in a movable manner through other components, so that the first moving member 7 can move relative to the heat sink 1; and wherein when the first moving member 7 is in a first state, the first moving member 7 blocks the insertion port 6 to prevent the transparent element 5 from accidentally falling off from the insertion port 6 or prevent other sharp devices from damaging the transparent element 5 through the insertion port 6; and when the first moving member 7 is in a second state, the first moving member 7 opens the insertion port 6 so that the transparent element 5 can be conveniently inserted into or removed from the insertion port 6.

The LED lamp further includes:

a second moving member 8 movably connected to the heat sink 1, and including a shaft hole 13 and a first installation portion 9, a first opening 10 arranged on the first installation portion 9 and facing a second surface 301 of the heat sink 1; and an elastic reset member arranged inside the first installation portion 9;

the first moving member 7 including:

a first plate 14 arranged on the second surface 301 of the heat sink 1;

a second plate 15 arranged on the first plane 400 of the first end 40 of the heat sink 1, and an angle formed between the first plate 14 and second plate 15; and a rotating shaft 12 located at an end of the first plate 14 away from the second plate 15, and inserted into the shaft hole 13; the first plate 14 and the second moving member 8 rotatably connected with each other through the rotating shaft 12 inserting into the shaft hole 13;

when the first moving member 7 is in the first state, the heat sink 1 including a first supporting member 16 and a second supporting member 17, both the first supporting member 16 and the second supporting member 17 spaced apart to form a rotating groove 18 therebetween, the rotating groove 18 connected to the shaft hole 13; the first supporting member 16 away from the second plate 15 relative to the second supporting member 17, and a height of the first supporting member 16 greater than a height of the second supporting member 17; and wherein when the first moving member 7 is in the first state, the first plate 14 is supported on the first supporting member 16, and the second plate 15 blocks the insertion port 6.

In a specific embodiment of the present disclosure, an LED lamp includes a heat sink 1 and at least one LED plate 2. The heat sink 1 includes a first surface 300 with a first receiving portion 3 being formed thereof. The at least one LED plate 2 is installed at a bottom portion 37 of the first receiving portion 3, a second receiving portion 4 arranged on a top portion 38 of the first receiving portion 3 to receive a detachable transparent element 5 therein, the transparent element 5 covering a light-emitting surface 39 of the at least one LED plate 2, an insertion port 6 arranged on the second receiving portion 4 and located on a first plane 400 of a first end 40 of the heat sink 1. A first moving member 7 is arranged on the first plane 400 of the first end 40 and corresponding to the insertion port 6, and when the first moving member 7 is in a first state, the first moving member 7 blocks the insertion port 6.

The heat sink 1 includes a middle portion 25 and two side portions 26 arranged on both sides of the middle portion 25 respectively, a gap 27 formed between the middle portion 25 and each of the two side portions 26, the at least one LED plate 2 installed in each of the two side portions 26, a power supply 28 arranged on the middle portion 25 and electrically connected to the at least one LED plate 2.

A cover 29 covers the peripheral of the power supply 28.

A wiring recess 30 is formed between the middle portion 25 and each of the two side portions 26, and located at the second end 41 of the heat sink 1, the wiring recess 30 connected to both the first receiving portion 3 and the cover 29, and the at least one LED plate 2 electrically connected to the power supply 28 through the wiring recess 30.

An interface 35 is arranged on the middle portion 25 of the heat sink 1, and a detachable sensor 36 is connected to the interface 35 and electrically connected to the at least one LED plate 2.

A cylindrical mounting member 31 with a threaded mounting hole, or a pair of U-shaped mounting members 33 is arranged on the second surface 301 of the heat sink 1, or a lifting rope 34 is connected to the second surface 301 of the heat sink 1.

The beneficial effect of the above embodiments is that the present disclosure can manually assemble or replace the transparent element 5 without needing additional tools.

For one of ordinary skill in the related art, the LED lamp described in embodiments of the present disclosure can replace the transparent element of the LED lamp by using a first member or using a plurality of members such as the first and second members. It should be understood that in order to replace the transparent element, it is also possible to use a plurality of members, such as three elements to cooperate with each other.

The above detail description is illustrated basic principles, main features, and advantages of the present disclosure. One of ordinary skill in the related art should understand that the present disclosure is not limited by the aforementioned embodiments. The aforementioned embodiments and detail description only illustrate the principles of the present disclosure. Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure. The protection scope of the present disclosure is defined by the accompanying claims and equivalents thereof.

At the same time, the attached drawings are only for illustrative purposes and represent only schematic drawings, rather than physical drawings, which are not by way of the limitation of the present disclosure. In order to clearly illustrate embodiments, examples of the present disclosure, some elements/elements in the accompanying drawings are omitted, enlarged or narrowed, rather than being represented actual sizes of products; it is understandable for one of ordinary skill in the related art that some well-known structures and corresponding explanations in the accompanying drawings are omitted. Moreover, the same or similar labels in the accompanying drawings of the embodiments of the present disclosure correspond to the same or similar elements.

In the description of the present disclosure, it needs to be understood that the terms mentioned below: "upper", "below", "front", "back", "left", "right", "vertical", "horizontal", "transversal", "longitudinal", "top", "bottom", "inner", "outer", etc, are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms used to describe positional relationships in the attached drawings are only for illustrative purposes, and illustrated in the detail description are not by way of the limitation of the present disclosure.

What is claimed is:

1. An LED lamp comprising a heat sink comprising a first surface with a first receiving portion being formed thereof; and at least one LED plate installed at a bottom portion of the first receiving portion, a second receiving portion arranged on a top portion of the first receiving portion to receive a detachable transparent element therein, the transparent element covering a light-emitting surface of the at least one LED plate, an insertion port arranged on the second receiving portion and located on a first plane of a first end of the heat sink; and wherein a first moving member is arranged on the first plane of the first end and corresponding to the insertion port, and a second moving member is arranged on a second plane of the first end and movably connected to the heat sink so that both the first moving member and the second moving member are movably connected to each other and move relative to the heat sink to open or close the insertion port.

2. The LED lamp as claimed in claim 1, wherein the second moving member comprises a first installation portion with a first opening facing a second surface of the heat sink, and an elastic reset member arranged inside the first installation portion.

3. The LED lamp as claimed in claim 2, wherein the first moving member comprises a rotating shaft, and the second moving member comprises a shaft hole; the first moving member is rotatably connected to the second moving member through the rotating shaft inserting into the shaft hole, so that the first moving member rotates around the rotating shaft.

4. The LED lamp as claimed in claim 3, wherein the first moving member comprises a first plate and a second plate arranged with an angle therebetween, the first plate arranged on the second surface of the heat sink, the second plate arranged on the first plane of the first end of the heat sink, the rotating shaft arranged on an edge of the first plate away from the second plate, the first plate movably connected to the second moving member, the second moving member configured to drive the first plate to move so as to adjust position states of the first moving member; and wherein when the first moving member is in a first state, the second moving member limits the first plate to move and the second plate blocks the insertion port; and when the first moving member is in a second state, the second moving member drives the first plate to move, and the second plate opens the insertion port.

5. The LED lamp as claimed in claim 4, wherein the heat sink comprises a first supporting member and a second supporting member separated from the first supporting member, the first supporting member away from the second plate relative to the second supporting member; when the first moving member is in the first state, the first plate covers both the first and second supporting members, and when the first moving member is in the second state, the first plate does not cover the first and second supporting members.

6. The LED lamp as claimed in claim 5, wherein a height of the first supporting member is greater than that of the second supporting member, and the first supporting member and the second supporting member are separated from each other so that a rotating groove is formed between the first supporting member and the second supporting member, and connected to the shaft hole.

7. The LED lamp as claimed in claim 6, wherein when the first moving member is in the first state, the first plate is supported on the first supporting member, and the second plate blocks the insertion port; and when the first moving member is in the second state, the rotating shaft of the first plate is received in the rotating groove so that the second plate rotates to open the insertion port.

8. The LED lamp as claimed in claim 5, wherein the first end of the heat sink comprises an end wall extending towards the first plate, a first portion of the elastic reset member abutting against an inner wall of the first installation portion, and a second portion of the elastic reset member abutting against the end wall.

9. The LED lamp as claimed in claim 8, wherein the second moving member comprises a side wall, the shaft hole arranged on the side wall and a notch provided on the side wall, the side wall separated from the end wall.

10. The LED lamp as claimed in claim 8, wherein the second moving member comprises a second opening arranged at an end of the second moving member that is close to the second plate, and a depth of the second opening is greater than a height of the end wall.

11. The LED lamp as claimed in claim 2, wherein the second moving member comprises a long-strip hole passing therethrough, and a screw passing through the long-strip hole to connect to the heat sink; a nut of the screw is un-contact with the second moving member along an axial direction of the screw.

12. The LED lamp as claimed in claim 1, wherein the heat sink comprises a middle portion and two side portions arranged on both sides of the middle portion respectively, a gap formed between the middle portion and each of the two side portions, the at least one LED plate installed in each of the two side portions, a power supply arranged on the middle portion and electrically connected to the at least one LED plate.

13. The LED lamp as claimed in claim 12, wherein a cover covers the peripheral of the power supply; and a wiring recess is formed between the middle portion and each of the two side portions, and located at the second end of the heat sink, the wiring recess connected to both the first receiving portion and the cover, and the at least one LED plate electrically connected to the power supply through the wiring recess.

14. The LED lamp as claimed in claim 1, wherein an interface is arranged on the middle portion of the heat sink, and a detachable sensor is connected to the interface and electrically connected to the at least one LED plate.

15. The LED lamp as claimed in claim 1, wherein a cylindrical mounting member with a threaded mounting hole, or a pair of U-shaped mounting members is arranged on the second surface of the heat sink, or a lifting rope is connected to the second surface of the heat sink.

16. An LED lamp comprising:

a heat sink comprising a first receiving portion and a second receiving portion respectively arranged on a first surface of the heat sink, both the first and second receiving portions connected with each other, the second receiving portion arranged on a top portion of the first receiving portion, an insertion port arranged on the second receiving portion and located on a first plane of a first end of the heat sink;

at least one LED plate installed in a bottom portion of the first receiving portion;

at least one transparent element covering a light-emitting surface of the at least one LED plate;

a first moving member arranged on the first end of the heat sink and directly connected to the heat sink in a movable manner, or the first moving member connected to the heat sink in a movable manner through other components, so that the first moving member moves relative to the heat sink; and wherein when the first moving member is in a first state, the first moving member blocks the insertion port; and when the first moving member is in a second state, the first moving member opens the insertion port; and wherein the LED lamp further comprises:

a second moving member movably connected to the heat sink, and comprising a shaft hole and a first installation portion, a first opening arranged on the first installation portion and facing a second surface of the heat sink; and an elastic reset member arranged inside the first installation portion;

the first moving member comprising:

a first plate arranged on the second surface of the heat sink;

a second plate arranged on the first plane of the first end, and an angle formed between the first plate and the second plate; and a rotating shaft located at an end of the first plate away from the second plate, and inserted into the shaft hole; the first plate and the second moving member rotatably connected with each other through the rotating shaft inserting into the shaft hole;

the heat sink comprising a first supporting member and a second supporting member, both the first supporting member and the second supporting member spaced apart to form a rotating groove therebetween, the rotating groove connected to the shaft hole; the first supporting member away from the second plate relative to the second supporting member, and a height of the first supporting member greater than a height of the second supporting member; and wherein when the first moving member is in the first state, the first plate is supported on the first supporting member, and the second plate blocks the insertion port.

17. An LED lamp comprising:

a heat sink comprising a first surface with a first receiving portion being formed thereof; and at least one LED plate installed at a bottom portion of the first receiving portion, a second receiving portion arranged on a top portion of the first receiving portion to receive a detachable transparent element therein, the transparent element covering a light-emitting surface of the at least one LED plate, an insertion port arranged on the second receiving portion and located on a first plane of a first end of the heat sink; and wherein a first moving member is arranged on the first plane of the first end and corresponding to the insertion port, and when the first moving member is in a first state, the first moving member blocks the insertion port; and wherein the LED lamp further comprises a second moving member movably connected to the heat sink and the first moving member; and wherein both the first moving member and the second moving member move relative to the heat sink so that when the first moving member is in a second state, the first moving member opens the insertion port; and wherein the second moving member comprises a first installation portion with a first opening facing a second surface of the heat sink, and an elastic reset member arranged inside the first installation portion.

18. The LED lamp as claimed in claim 17, wherein the heat sink comprises a middle portion and two side portions arranged on both sides of the middle portion respectively, a gap formed between the middle portion and each of the two side portions, the at least one LED plate installed in each of the two side portions, a power supply arranged on the middle portion and electrically connected to the at least one LED plate; and wherein a cover covers the peripheral of the power supply; and a wiring recess is formed between the middle portion and each of the two side portions, and located at the second end of the heat sink, the wiring recess connected to both the first receiving portion and the cover, and the at least one LED plate electrically connected to the power supply through the wiring recess.

19. The LED lamp as claimed in claim 18, wherein an interface is arranged on the middle portion of the heat sink, and a detachable sensor is connected to the interface and electrically connected to the at least one LED plate; and wherein a cylindrical mounting member with a threaded mounting hole, or a pair of U-shaped mounting members is arranged on the second surface of the heat sink, or a lifting rope is connected to the second surface of the heat sink.

* * * * *